H. C. STOLL.
EARMARK.
APPLICATION FILED APR. 12, 1910.
982,896.
Patented Jan. 31, 1911.
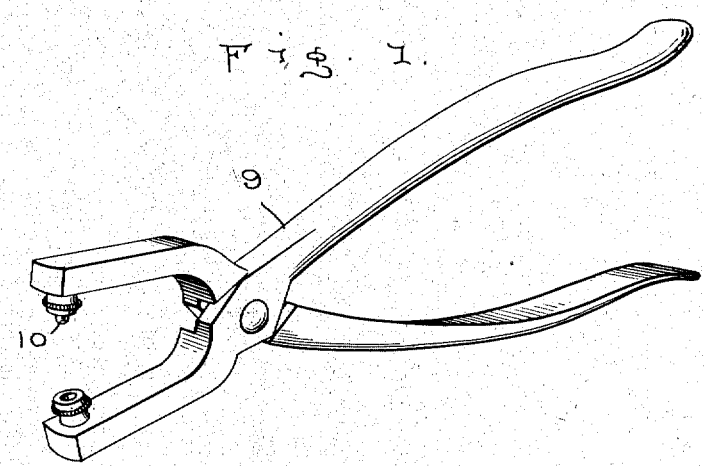
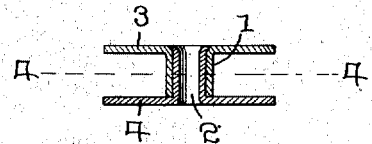
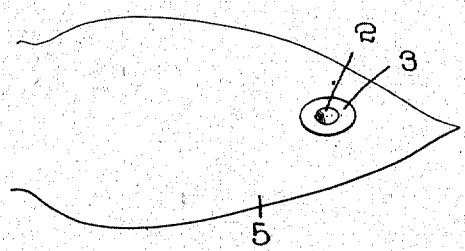
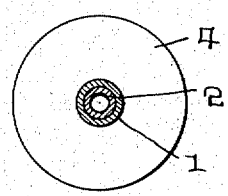
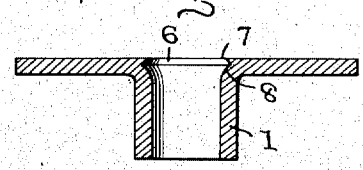
WITNESSES:
Thos W Riley
N. Newcomb
INVENTOR
H. C. Stoll
BY
W. J. Fitzgerald & Co
Attorneys

UNITED STATES PATENT OFFICE.

HENRY C. STOLL, OF BEATRICE, NEBRASKA.

EARMARK.

982,896. Specification of Letters Patent. Patented Jan. 31, 1911.

Application filed April 12, 1910. Serial No. 555,081.

*To all whom it may concern:*

Be it known that I, HENRY C. STOLL, a citizen of the United States, residing at Beatrice, in the county of Gage and State of Nebraska, have invented certain new and useful Improvements in Earmarks; and I do hereby declare the following to be a full, clear, and exact description of the invention, such as will enable others skilled in the art to which it appertains to make and use the same.

My invention relates to new and useful improvements in ear marks and more particularly to that class adapted to be used for marking stock of various kinds, whereby a perfect and positive register of the stock may be kept and my object is to provide a mark in two parts, the stems of which are telescoping and interlocking.

A further object is to provide disks at the ends of the stems which will engage opposite sides of the ears of the animal and upon which certain markings may be placed when desired.

A further object is to so arrange said disks as to cause the same to closely engage the opposite faces of the ears to prevent the disks from catching upon objects as the animal is moving about, and, a further object is to provide a seat in one of the stems to receive the end of the opposite stem to guard against the releasing of the latter stem from the former.

Other objects and advantages will be hereinafter referred to and more particularly pointed out in the specification and claim.

In the accompanying drawings which are made a part of this application, Figure 1 is a perspective view of the instrument used in attaching the marks to the ear of the animal. Fig. 2 is a perspective view showing one of the marks applied to use. Fig. 3 is a vertical sectional view through the mark. Fig. 4 is a transverse sectional view thereof as seen on line 4—4 Fig. 3, and, Fig. 5 is a sectional view of one section of the mark.

Referring to the drawings in which similar reference numerals designate corresponding parts throughout the several views, 1 and 2 indicate the stems respectively of the two sections of the mark, the stem 2 being adapted to telescope and fit within the stem 1.

At one end of each of the stems is a disk 3 and 4 respectively, which disks are preferably flat and are adapted to closely engage the opposite faces of the ear 5 of the animal and in view of the extent of the disks, various characters for marking purposes may be placed thereon.

On the interior of the stem 1 and at the end thereof having the disk 3 is formed a circumferential groove 6, into which the free end of the stem 2 is adapted to be forced and by providing the groove substantially V shaped, the upper wall 7 thereof will overhang the end of the stem 2, when the end of said stem is forced into the groove, the lower wall 8 of the groove being curved so that when the end of the stem 2 is spread to interlock the same with the stem 1, the end face of the stem will register with the upper wall 7 of the groove.

In actual practice, the depth of the groove would be very slight in view of the thinness of the material used in forming the stems, but is of sufficient extent to overlap the end of the stem to prevent a knife or other instrument from being readily forced below the clenching end of the stem 2 to release the same from the stem 1, thereby rendering it practically impossible for the mark to be removed after once applied to use.

In applying the mark, an opening is made through the ear of an animal and the stem 1 introduced therethrough, when the stem 2 is introduced into the lower end of the stem 1 and moved upwardly therein until the end of the stem 1 engages the inner face of the disk 4 and by selecting stems of the proper length to correspond with the thickness of the ear of the animal, the disks will snugly engage the opposite faces of the ear. The free end of the stem 2 is then spread and seated within the groove 6 through the medium of a pair of pliers 9, one of the jaws of the pliers having a mandrel 10 thereon, which enters the opening through the stem 2 and by tapering the mandrel, the end of the stem 2 will be gradually spread, as the mandred is forced into the stem, the taper of the mandrel causing the stem to spread uniformly, and engage the groove 6.

In view of the rigidity of the stems 1 and 2, the pressure required to clench the end of the stem 2 will not affect the position of the disks with respect to the ear, but will positively force the end of the stem into engagement with the groove in the opposite stem.

The disks 3 and 4 are so arranged as not to cause an irritation to the ear, which frequently happens in other forms of marks, which results in the ears decaying and the losing of the mark. It will likewise be seen that by providing circular disks, objects such as brush, wires of fences, etc., will not catch upon the disks when the ear of the animal is moved against the same and should for any reason an object catch upon the mark, said mark will readily rotate and release the object, when the animal moves the ear away from the object.

The mark is made of a light metal so that any suitable form of marking characters may be placed thereon and it will be seen that in view of the lightness of the mark, the weight thereof on the ear of the animal will not be appreciable.

It will further be understood that the groove can be dispensed with, if preferred, and the end of the stem, when spread, forced into engagement with the curved face of the other stem.

What I claim is:—

An ear mark, comprising a pair of telescoping stems having disks at one of their ends, one of said stems having a V shaped groove therein adapted to receive the end of the opposite stem when the latter stem is spread to lock the two stems together, one wall of the groove overhanging the end of the locking stem.

In testimony whereof I have signed my name to this specification in the presence of two subscribing witnesses.

HENRY C. STOLL.

Witnesses:
   J. T. GREENWOOD,
   WALTER D. HILL.